INVENTORS
GRAHAM D. McVICKER
FRANK W. FINK
BY
Knox & Knox

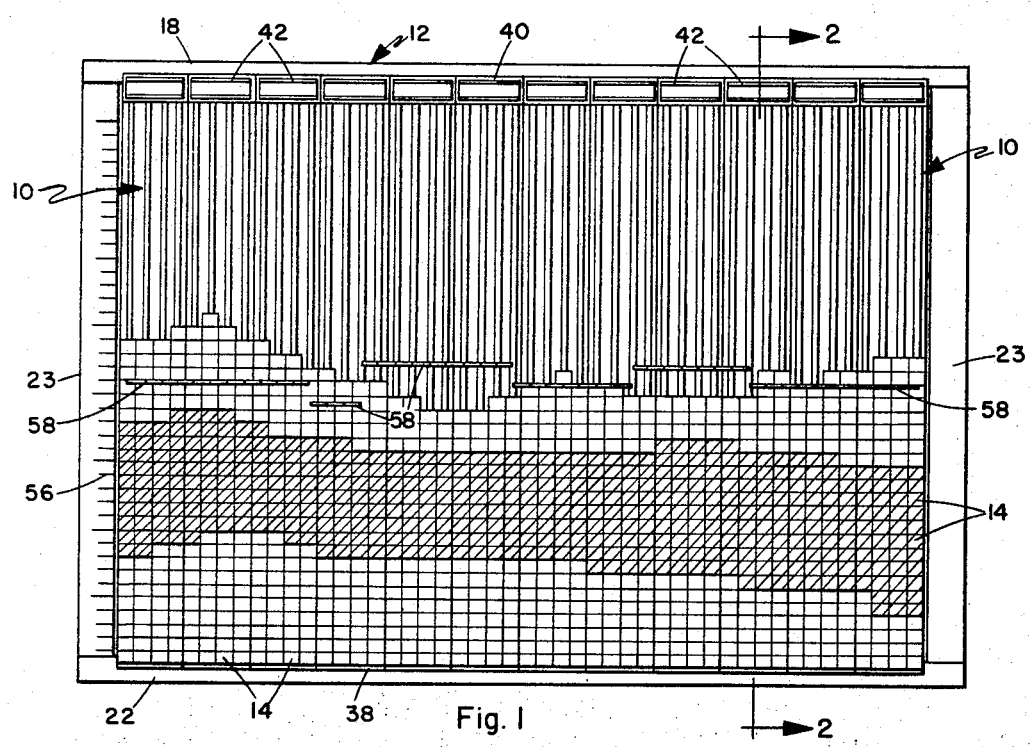
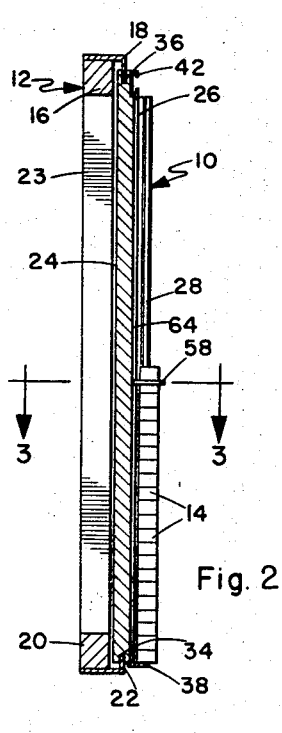
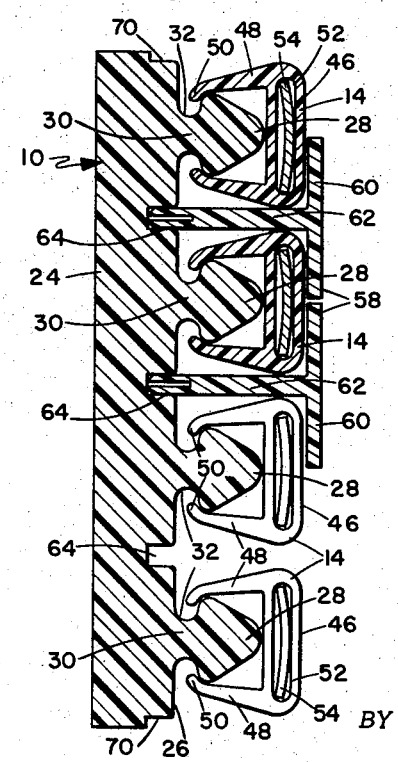
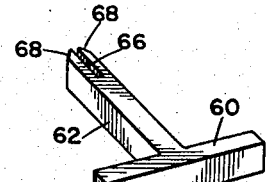

United States Patent Office 3,419,979
Patented Jan. 7, 1969

3,419,979
PROGRAM CONTROL DISPLAY
Graham D. McVicker and Frank W. Fink, San Diego, Calif., assignors to San Diego Aircraft Engineering, Inc., San Diego, Calif., a corporation of California
Filed July 13, 1967, Ser. No. 653,071
U.S. Cl. 40—64   11 Claims
Int. Cl. G09f 7/10; G09b 19/18; G09f 9/00

ABSTRACT OF THE DISCLOSURE

The display comprises a set of board units which are individually movable and interchangeable on a common supporting means, each board unit carrying a plurality of columns of self-stacking, discrete coded marker elements adapted to depict a plurality of distinct display patterns, the markers being individually removable and replaceable without disturbing the basic pattern of the other elements, and the whole providing a composite graphic representation of a predetermined program which is easily kept up to date as the represented factors progress.

*Background of the invention*

The present invention relates to visual displays and specifically to a program control display.

There are many ways of producing a graphic display of data, such as work progress, labor required, stock information and the like, some being simple charts of a more or less fixed nature and others being constantly variable. In the latter category there are arrangements of rods, blocks, tapes and other such elements which can be varied in color and length to represent certain factors. In most instances, substitution of elements to show changing data will disturb the overall display and rearrangement is necessary, especially if several types of data are included in a composite display.

*Summary of the invention*

The display described herein utilizes standardized board units slidably mounted on a supporting structure and being movable and interchangeable as required. Each board unit carries a plurality of columns of self-stacking markers which can be coded and arranged in any specific pattern to show data in local areas or continuous through the display. Markers can be removed from or added to any part of the display without disturbing the representation of the remainder of the display. The markers are very easy to insert or remove and columns of markers slide readily when changes are made, yet they are held securely in place once attached to the board units.

*Brief description of the drawings*

FIGURE 1 is a view of the complete display with a typical arrangement of markers;

FIGURE 2 is a sectional view taken on line 2—2 of FIGURE 1;

FIGURE 3 is an enlarged sectional view of the board unit taken on line 3—3 of FIGURE 2;

FIGURE 4 is a perspective view of a single capacity bar marker; and

Similar characters of reference indicate similar or identical elements and portions throughout the specification and throughout the views of the drawings.

*Description of the preferred embodiment*

Figure 5:
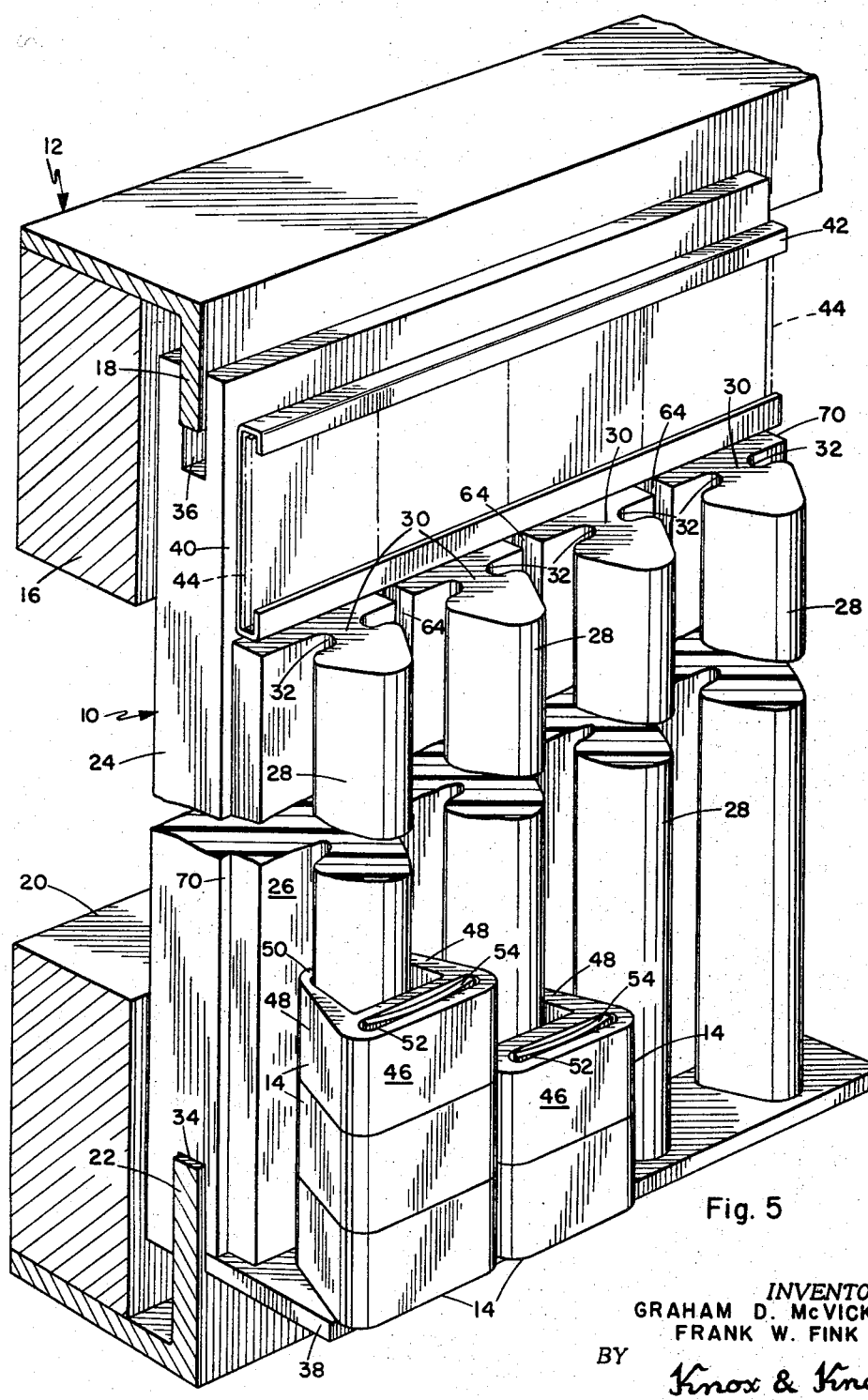
FIGURE 5 is a broken perspective view of a single board unit and its supports.

The display is composed of a plurality of board units 10 mounted on a supporting frame 12 and carrying markers 14. Frame 12, as illustrated, comprises an upper cross bar 16 with a downwardly flanged longitudinal rail 18 and a lower cross bar 20 with an upwardly flanged rail 22, the cross bars being connected in a rectangular structure by vertical end posts 23. The frame can be constructed in any suitable manner and with a variety of materials, either as a unit or as part of another structure. In the latter instance the end posts and even the cross bars may be dispensed with, the rails being the critical supporting elements.

Each board unit 10 comprises an elongated rectangular panel 24, on the front face 26 of which are a plurality of longitudinally extending, parallel spaced ribs 28. Four ribs are shown as an example, but any reasonable number could be used depending on the nature of the display. Each rib 28 is spaced forwardly from front face 26 by a thin neck portion 30, leaving undercut channels 32 between the rib and the front face an opposite sides of said neck portion. As illustrated, each rib is generally triangular in cross section with the corners smoothly rounded and an apex projecting forward to facilitate attachment of the markers. However, other configurations may be used as long as the channels are provided and the forward portion is tapered to some extent. The board unit 10 is particularly suited for manufacture by extrusion from metal, plastic, or the like and cut to length as needed. The lower end of panel 24 has a transverse slot 34 to fit over rail 22, the upper end having a similar slot 36 to receive rail 18, so that the board unit is slidable along the rails. Upper slot 36 is deeper than rail 18 by an amount sufficient to allow the board unit to be lifted clear of lower rail 22, for installation and removal of the unit. Fixed to the lower end of panel 24 is a plate-like platform 38 projecting forwardly below ribs 28 to provide a rest or support for the columns of markers. At the upper end of panel 24 the front face has a cut back portion 40 for mounting of a card holder 42, in which cards 44 or similar means may be inserted to identify the individual columns. For some purposes the cut back portion could be at the lower end of the panel below platform 38, such as for access and visibility in a large or high mounted display. The configuration of card holder 42 is typical, various types of suitable channelled material being readily available and the cut back portion ensuring that the card holder is clear of the upper ends of the ribs 28.

Each marker 14 comprises a generally rectangular front plate portion 46, with legs 48 diverging rearwardly from opposite ends thereof, the marker thus being somewhat U-shaped in cross section. Legs 48 are resilient and the rear edges of the legs have inwardly turned rounded flanges 50 which fit into channels 32 and hold the marker in place on the rib 28. The marker is also adaptable to manufacture as an extrusion from metal, plastic, or the like and can be made of any desirable length depending on the data to be represented. If the marker is made from plastic material which is transparent or translucent, the front plate portion 46 is provided with a vertically extending slot 52, which may be formed in the extrusion. A card 54, carrying any suitable type of code or identification, can then be inserted in slot 52 to make the marker distinctive for a specific purpose. Alternatively, or if the marker is made from metal or other opaque material, the front face of plate portion 46 may be coded or marked in any suitable manner. As a further alternative the entire marker could be made from a distinctively colored material.

In a typical display shown in FIGURE 1, the markers are set up to represent three concurrent programs in terms of manpower required. Each column could represent one day or one week and each marker in the column be one man for the specific period. One or both end posts 23 may be marked with suitable graduations 56 to indicate the number of markers in a column and facilitate rapid reading of the data. Each program, represented by a distinctly coded set of markers, extends horizontally across the display, the three programs being positioned in a vertical stack. Markers may be added to or removed from any set of markers in any column, withoutout distrubing the other sets or programs. The individual column in which a change is made will become higher or lower, but the value or number of markers in the sets not changed will be unaffected. Since the data is represented by a specific number of markers in each column and the vertical position of each set is unimportant due to the distinctive coding, no rearrangement is necessary when changes are made.

In many instances it is desirable to have some indication of available manpower, so that an excess or deficiency of manpower in relation to the program requirements can be seen at any time. This is accomplished by means of capacity bar markers 58, each being generally T-shaped with a narrow horizontal bar portion 60 and a rearwardly extending leg 62. In the front face of panel 24 between and parallel to ribs 28 are longitudinal channels 64 to receive the tips of legs 62 and hold the bar markers. For clarity of drawing these channels are omitted from FIGURE 1. The leg 62 is narrow enough to pass between adjacent columns of markers 14, the rear end of the leg being slit, as at 66 and the outer corners 68 bevelled or tapered to facilitate entry into a channel 64, the slit end being resilient and gripping inside the channel sufficiently to retain the bar marker. Bar portion 60 is of sufficient length to overlap adjacent markers 14 substantially to their centers, so that adjacent bar markers form a generally continuous row. The length of leg 62 is such that bar portion 60 is held just clear of the front faces of markers 14, so that the markers are movable independently of the bar markers. The side edges of panel 24 have recessed half channels 70, which cooperate on adjacent board units to form complete channels for the bar markers. As illustrated in FIGURE 1, the bar markers 58 are applied in horizontal line groups, showing that extra manpower will be required during some periods and less during others. Different levels of groups of the bar markers indicate changes in available manpower during those periods, the positioning being completely independent of markers 14. When there are changes in available manpower, as by employee absence, added employees, essential machines out of operation, new labor-saving equipment added or other factors, the bar markers are moved to indicate the changes. Thus the current available manpower and required manpower are instantly seen at all times. Other uses for the bar markers for different types of data displays will be obvious.

Reading in the conventional direction the program will start at the left hand side and progress to the right, with the column designations clearly identified on the cards 44 at the top of each board unit. As each portion of the program is completed the pertinent board unit 10 is removed from the left hand side and the others slid over. If the program is to continue, the board unit can be replaced at the right hand side and the markers rearranged to suit. Thus the diplay can be changed continuously to show existing conditions, without interfering with the basic data.

It should be understood that this is merely representative of a typical use of the display and that many different types of data can be shown. The simple construction and the ease with which changes can be made make the assembly adaptable to many different uses. For rapidly changing data, the markers are freely slidable vertically on ribs 28 and so stack themselves automatically. To insert a marker into a column, the portion of the column above the desired location is merely lifted to provide clearance for the marker to be snapped in place, then allowed to drop and reform the unbroken column. It is not necessary to slide markers to the top of the bread unit for removal, so markers need not be removed and replaced unnecessarily as changes are made.

It is understood that minor variation from the form of the invention disclosed herein may be made without departure from the spirit and scope of the invention, and that the specification and drawings are to be considered as merely illustrative rather than limiting.

We claim:
1. Display means, comprising:
supporting means including upper and lower rails;
a plurality of board units slidably mounted on and between said rails;
each of said board units having a plurality of parallel ribs protruding from one face thereof, with undercut channels between the ribs and said one face;
and a plurality of visually distinctive markers each having a resilient portion adapted to snap over one of said ribs and engage in said channels to retain the marker.

2. The structure of claim 1, wherein each of said board units comprises an elongated, generally flat panel, said ribs having narrow neck portions connected to said panel and defining said channels on opposite sides of the neck portions.

3. The structure of claim 1, wherein each of said markers comprises a generally flat front plate portion, with resilient legs extending rearwardly from opposite sides thereof to straddle one of said ribs.

4. The structure of claim 3, wherein said legs have inwardly turned rear flange portions for engagement in said channels.

5. The structure of claim 3, wherein said front plate portion has a slot therein to receive an identifying element.

6. The structure of claim 1, wherein said markers are slidable along said ribs.

7. The structure of claim 1, wherein said board units are held substantially vertically between said rails, the lower end of each board unit having a platform projecting below said ribs to support columns of markers thereon.

8. The structure of claim 7, wherein each board unit has a cut back portion on at least one end thereof, and identification holding means on said cut back portion clear of the ends of said ribs.

9. The structure of claim 1, wherein said board unit has channels in said one face disposed between and parallel to said ribs;
and further including a plurality of bar markers each having a leg extending between adjacent markers and engaging frictionally in one of said channels, and a bar portion extending across the exposed faces of the markers and spaced clear of the markers.

10. The structure of claim 9, wherein the end of each of said bar marker legs is slit and resilient to grip within the channel.

11. The structure of claim 9, wherein the opposite edges of each board unit parallel to said ribs on said one face have recessed half channels, which cooperate on adjacent board units to form channels for said bar markers.

References Cited

UNITED STATES PATENTS 2,787,850  4/1957  Ware _____ 40—65
2,944,355  7/1960  Parkinson _____ 40—63

FOREIGN PATENTS 828,057  2/1960  Great Britain.

WILLIAM H. GRIEB, *Primary Examiner.*

U.S. Cl. X.R.

35—24; 40—65; 116—135